United States Patent [19]

Jackson

[11] Patent Number: 4,731,928
[45] Date of Patent: Mar. 22, 1988

[54] CUTTING TOOL FOR COAXIAL CABLE

[75] Inventor: Samuel H. Jackson, Ardsley, N.Y.

[73] Assignee: Kings Electronics Co., Inc., Tuckahoe, N.Y.

[21] Appl. No.: 718,908

[22] Filed: Apr. 2, 1985

Related U.S. Application Data

[63] Continuation-in-part of Ser. No. 525,581, Aug. 23, 1983, Pat. No. 4,481,327.

[51] Int. Cl.$^4$ .......................... B21F 13/00; B26B 27/00
[52] U.S. Cl. ...................................... 30/90.2; 30/91.2; 81/9.41
[58] Field of Search .................. 30/90.1, 90.2, 91.2; 81/9.42, 9.41, 9.43, 9.44

[56] References Cited

U.S. PATENT DOCUMENTS

| | | | |
|---|---|---|---|
| 3,596,540 | 8/1971 | Hooper | 30/90.1 |
| 3,614,904 | 10/1971 | Young et al. | 30/90.1 |
| 4,370,808 | 2/1983 | Maytham | 30/90.1 X |
| 4,452,105 | 6/1984 | Harootion | 30/90.1 |

Primary Examiner—Douglas D. Watts
Attorney, Agent, or Firm—Jordan B. Bierman

[57] ABSTRACT

A cutting tool for preparing an end of semi-rigid coaxial cable for connector attachment includes interengageable piloting clamp and cutter head assemblies. The piloting clamp is provided with a bore for receiving the cable end, a coaxial shank portion from which the cable end is located to project a selected distance and a securement member for retaining the cable end in the piloting clamp. The cutter head includes a bore for receiving the piloting clamp shank portion and projecting cable end slidably and coaxially advanced therein, a cutter blade for cutting the insulating material and outer conductor of the cable away from its center conductor, and a stop for stopping advance of the shank portion in the cutter head so as to leave a predetermined length of the center conductor exposed.

3 Claims, 10 Drawing Figures

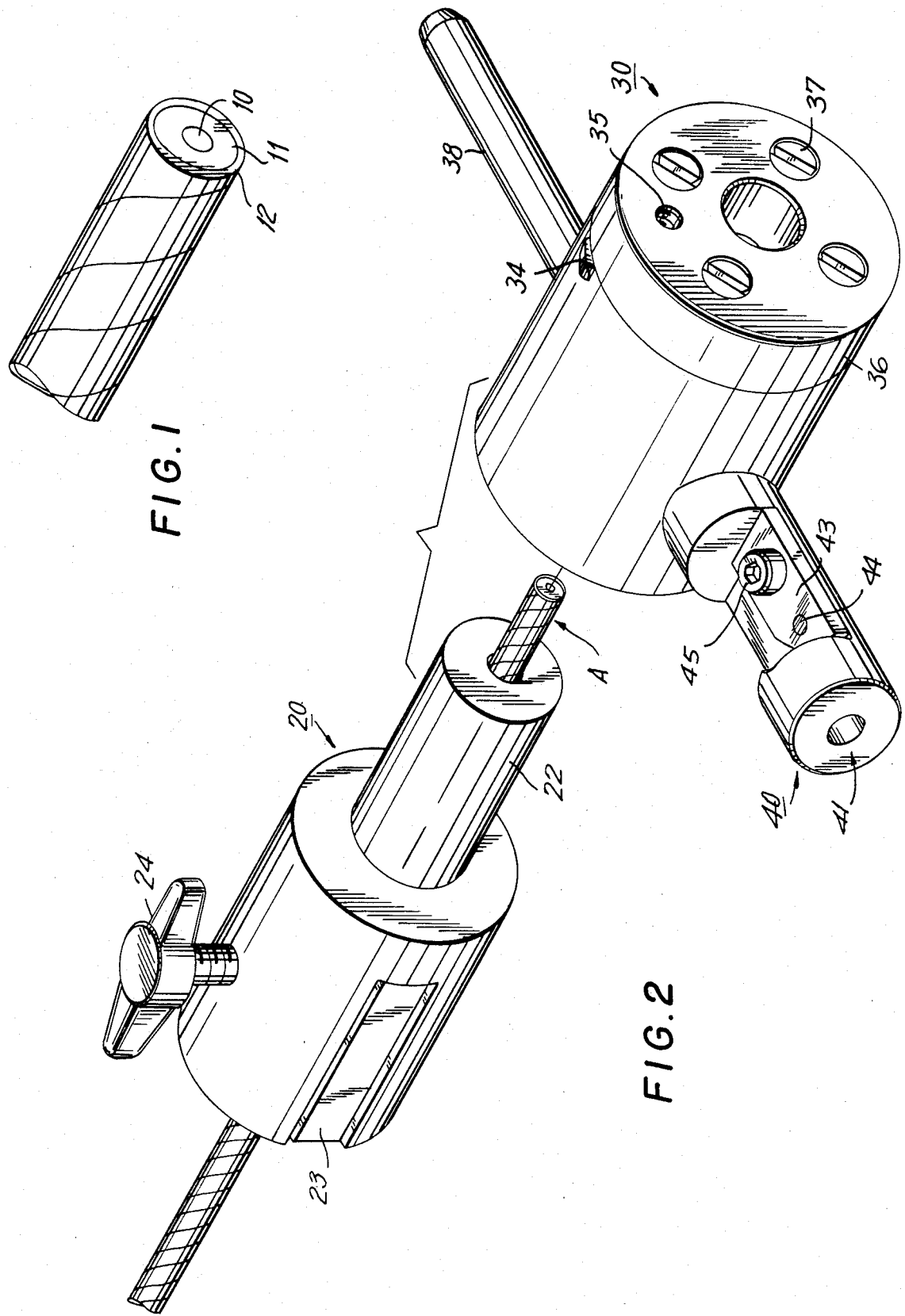

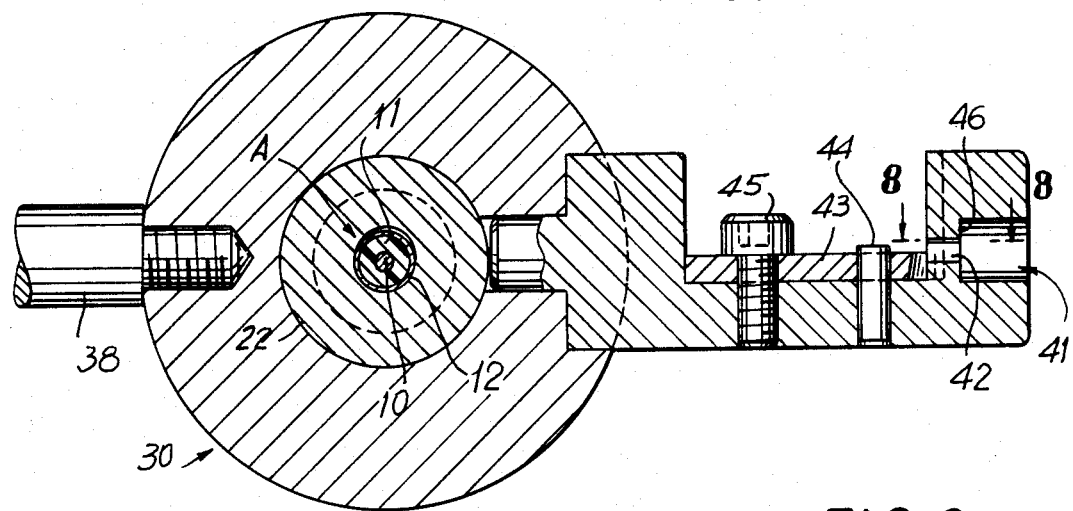
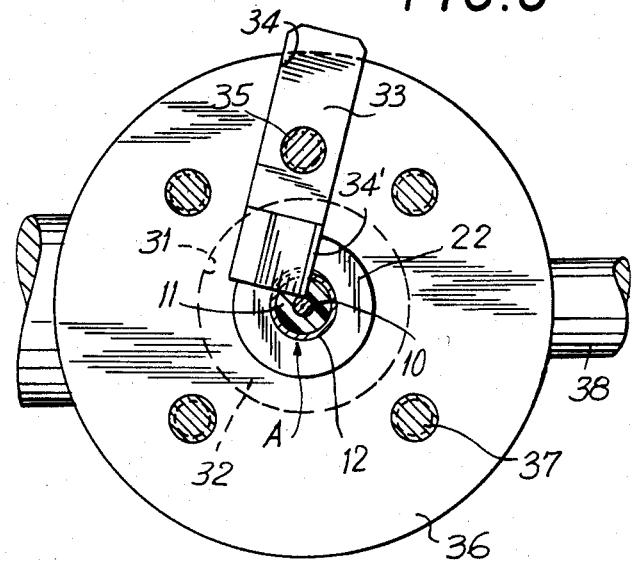
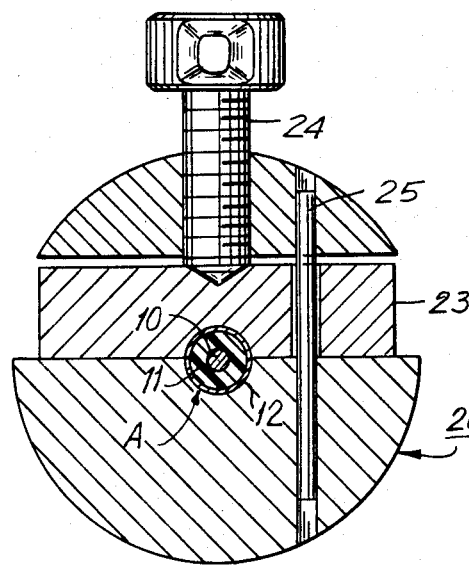
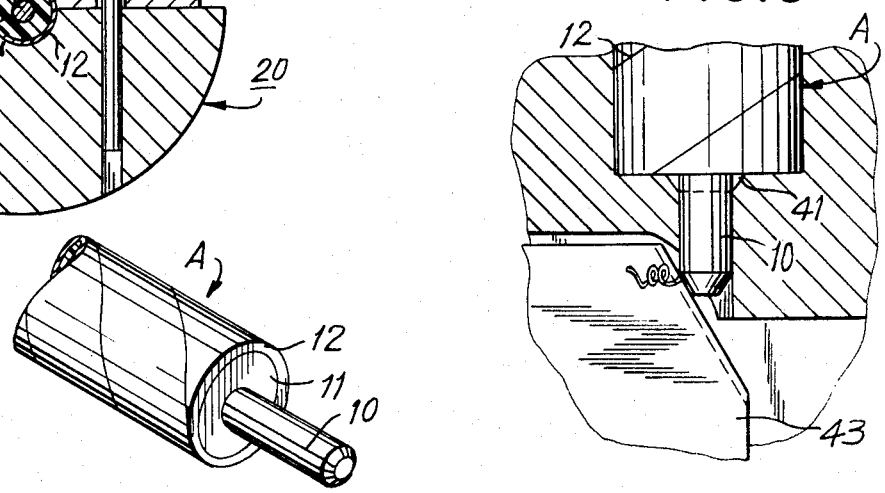
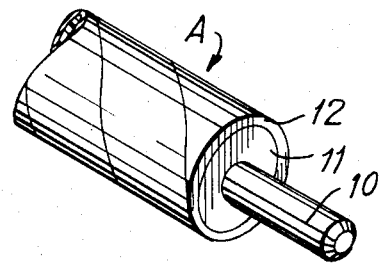

CUTTING TOOL FOR COAXIAL CABLE

This Application is a continuation-in-part of application Ser. No. 525,581, filed Aug. 23, 1983, now U.S. Pat. No. 4,481,377.

BACKGROUND OF THE INVENTION

This invention relates to a cutting tool for preparing an end of a semi-rigid coaxial cable for connector attachment.

A principal object of the invention is to provide a simple hand tool for field use which will enable even unskilled persons to trim semi-rigid coaxial cable to specified dimensions rapidly and accurately. This type of cable generally has a solid center conductor surrounded by dielectric or insulating material and a continuous metallic outer conductor over the dielectric material. For connector attachment, the outer conductor and dielectric material must be trimmed back to expose a specified length of the center conductor, and the end of the exposed center conductor must be chamfered to specified dimensions.

A further object of the invention is to provide a cutting tool which, once positioned with respect to the end of the cable, requires no further adjustment and only a minimal axial force to cut through the cable material.

SUMMARY OF THE INVENTION

The above and other purposes of the invention are achieved by a unique cutting tool comprising a piloting clamp which is secured over the cable at a selected distance from its end, and a cutter head that slides over and is helically rotated by the user about a shank portion of the piloting clamp to trim the outer conductor and dielectric material away from the center conductor to a predetermined distance from the end of the cable. A light torque about the cable axis causes a cutter blade mounted within the cutter head to slice through the cable material in a helical path. The blade is mounted in the head so that its cutting edge lies along a radial line through the center conductor. It is an important feature of the present invention to provide a blade in which both the upper and lower surfaces are at an angle other than 90° to the face of the trimmed dielectric.

The cutter head has an integral stop shoulder which limits the travel of the cutter through the cable material so that the cut is completed at the predetermined distance and in a plane perpendicular to the cable axis. The cutter blade is radially adjustable within the cutter head to allow trimming to different diameters of the center conductor. The cutter head may be provided with handles for the user to grip the tool for the helical cutting motion. One of the handles may be provided with a chamfer cutter into which the end of the exposed center conductor can be inserted and the cutter rotated to chamfer the end to predetermined dimensions from the face cut of the outer conductor and dielectric material.

BRIEF DESCRIPTION OF THE DRAWINGS

The invention is illustrated by the example shown in the accompanying drawings, of which:

FIG. 1 depicts an end of a typical coaxial cable;

FIG. 2 is a perspective view of a preferred embodiment of the piloting clamp and cutter head of the invention;

FIG. 5 is a sectional end view of the embodiment of FIG. 3 showing a handle thereof as a chamfer cutter;

FIG. 6 is a sectional end view of the embodiment of FIG. 3 showing a cutter blade of the cutter head;

FIG. 7 is a sectional end view of the piloting clamp shown in FIG. 3;

FIG. 8 is a sectional plan view of the chamfer cutter in FIG. 5 applied to an end of the exposed center conductor;

FIG. 9 is a perspective view of the end of the coaxial cable prepared by the application of the cutting tool in accordance with the invention.

DETAILED DESCRIPTION OF THE PREFERRED EMBODIMENT

Figure 3:
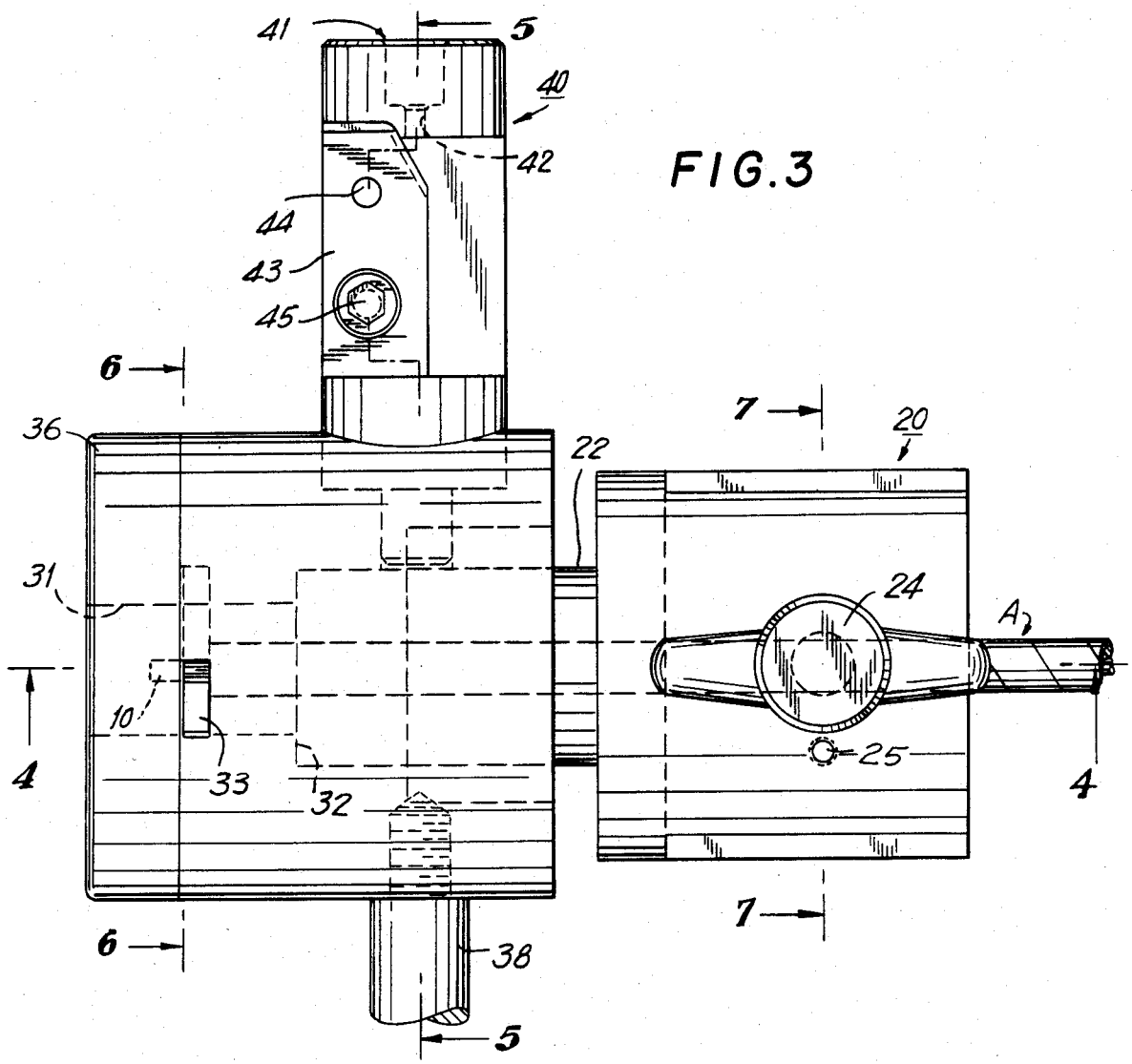
FIG. 3 is a schematic plan view of the piloting clamp and cutter head applied in accordance with the invention.

The following is a detailed description of a preferred embodiment of the invention illustrated in the drawings.

Referring to FIG. 1, an end of a typical semi-rigid coaxial cable has a solid center conductor 10 surrounded by a layer of dielectric material 11 and a semi-rigid metallic outer conductor 12.

Figure 4:
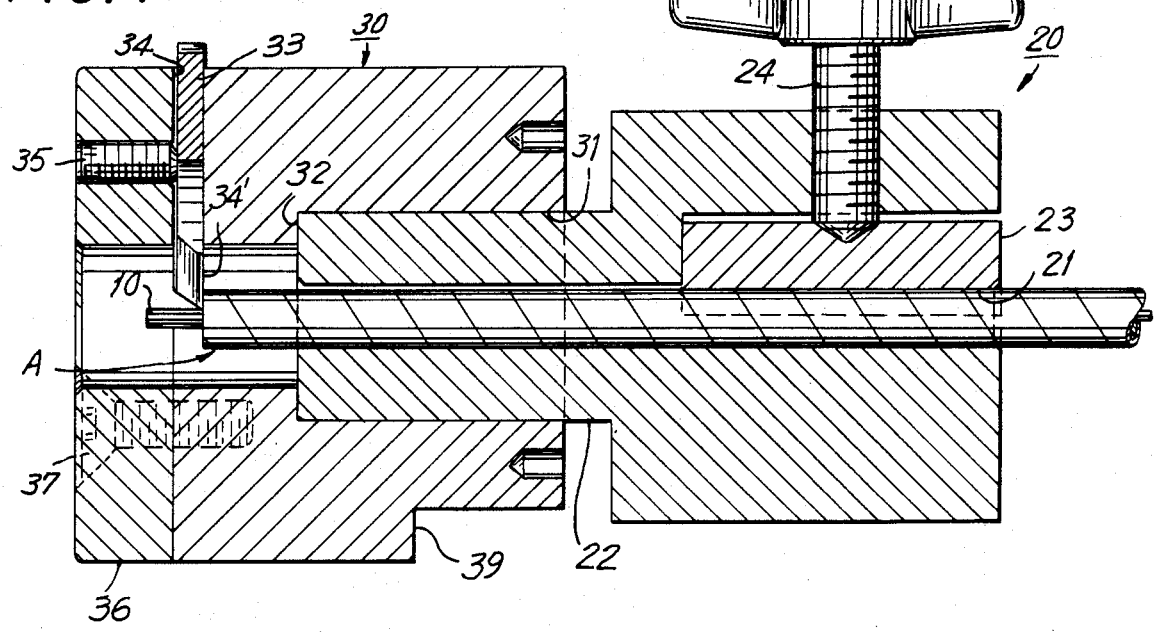
FIG. 4 is a sectional side view of the embodiment shown in FIG. 3.

In accordance with the invention, a piloting clamp 20 and cutter head 30, shown in FIGS. 2 to 4, form a cutting tool for application to the end of the cable. The clamp 20 has a center bore 21 sufficiently large to accommodate a desired range of cable diameters, a shank portion 22, a clamping plate 23, a guide pin 25 (FIG. 7), and a threaded tee bolt 24 for applying a clamping force to the cable, as more clearly shown in FIG. 7. The user secures the cable in the piloting clamp so as to leave a measured amount of cable, designated by the letter A in FIG. 2, projecting from the shank portion 22 of the clamp.

The cutter head 30 has a bore 31 for receiving the shank portion 22 of the piloting clamp, and an internal stop shoulder 32 for stopping the forward movement of the shank portion 22 within the bore 31 of the cutter head 30. A cutter blade 33 is located in a channel 34 of the cutter head 30 and secured in position by a set screw 35 threaded through a face plate 36. The blade is located so that its cutting edge 34' defines a radial line through the center of the center conductor. The face plate 36 is secured to the cutter head body by screws 37. The cutter head is provided with handles 38 and 40, radially extending from the opposite sides of the cutter head 30. One of the handles 40 may be provided as a chamfer cutter, as described in further detail below. The cutter head may have a step or groove 39 of a predetermined length as a convenient measure for setting an exact amount of the cable end A to project from the shank portion 22.

Referring to FIGS. 4 and 6, the cutting operation of the cutter head 30 and blade 33 is initiated as the shank 22 of the piloting clamp 20, with the measured amount of cable end A projecting therefrom, is slidingly inserted in the bore 31 of the cutter head 30 until the end of the cable engages the cutter blade 33. The user rotates the head about the shank 22 using the handles 38 and 40 if desired. The blade 33 is set in the cutter head by set screw 35 so as to locate its cutting edge 34' at the proper relation to the center conductor 10.

Figure 10:
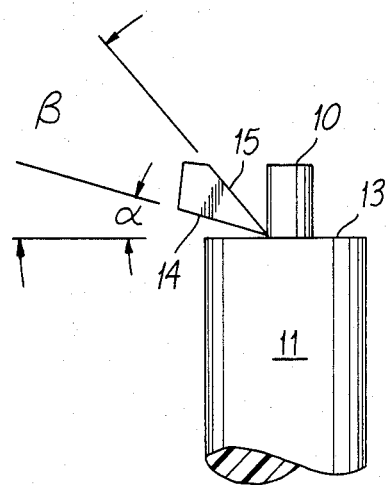
FIG. 10 is a sectional view showing the blade angles of another embodiment of the invention.

As the user turns the head 30, the cutting edge slices through the outer conductor 12 and dielectric material 11 of the cable end A in a helical path as the shank 22 is advanced axially relative to the cutter head 30. The angle between dielectric face 13 and lower blade face 14 is $\alpha$, while the angle between face 13 and upper blade face 15 is $\beta$. These angles should be greater than 0° and less than 90°, $\alpha$ always being smaller than $\beta$ (See FIG. 10). These angles determine the pitch of the helical cut and greatly reduce the torque required to effect the cutting. When the shank 22 has advanced to a predetermined distance defined by the stop shoulder 32, the helix cut by the blade 33 is completed, leaving a predetermined amount of center conductor 10 exposed and the outer conductor and dielectric material trimmed to an even face cut perpendicular to the cable axis, as shown in FIG. 9.

Referring to FIGS. 3, 5, and 8, the chamfer cutter 40, serving a dual purpose as a handle for the cutter head, has a receiving bore 41 for the cable end A and a guide 42 for the exposed center conductor 10, a chamfer blade 43, a pin 44 for locating the chamfer blade 43 adjacent the exit side of the guide 42, and a set screw 45 for securing the chamfer blade 43 at the desired angle and depth for chamfering the exposed center conductor end. The user rotates the chamfer cutter relatively about the cable end so as to chamfer the center conductor end until the face cut of the cable end meets the end wall 46 of the bore 41.

The finished product of the application of the cutting tool, shown in FIG. 9, results in cable end A having the outer conductor and dielectric material trimmed back the desired distance from the chamfered nd of the exposed center conductor 10. The finished end can now be readily attached in a cable connector.

Although this invention is described with reference to the above specific materials, steps and elements, it will be understood that a variety of modifications may be made without departing from the principles of the invention. For example, parts may be reversed, sequences of steps may be modified, and various equivalent elements may be substituted for those specifically shown and described. All such modifications are intended to be included within the spirit and scope of the invention, which is defined in the following claims.

What is claimed is:

1. A cutting tool for preparing an end of a coaxial cable, of the type having a center conductor surrounded by an insulating material and a coaxial outer conductor, for connector attachment comprising: a piloting clamp having a bore for receiving the cable end, a coaxial shank portion from which the cable end is located to project a selected distance, said cable end having an end face, and clamping means for clamping the located cable end in the piloting clamp; the shank portion of the piloting clamp and projecting cable end slidably and coaxially advanced therein, a cutter blade mounted within the cutter head for cutting the insulating material and outer conductor away from the center conductor, said blade having an upper face and a lower face, there being an angle $\alpha$ between said end face and said lower face and an angle $\beta$ between said end face and said upper face, each of $\alpha$ and $\beta$ being greater than 0° and less than 90°, $\alpha$ being less than $\beta$, and stop means for stopping the advance of the shank portion in the cutter head so as to leave a predetermined length of the center conductor exposed, said cutter head being provided with a handle having a chamfer cutter for the exposed end of the center conductor.

2. The cutting tool described in claim 1 wherein the cutter head has a step or groove formed therein for measuring a predetermined length of the cable end to project from the shank portion.

3. The cutting tool described in claim 1 wherein the cutter head further includes adjusting means for adjusting the cutter blade radially with respect to the center bore axis.